Inventors
FRANCOIS DALLE
GREGOIRE KALOPISSIS
BORIS DARAGAN

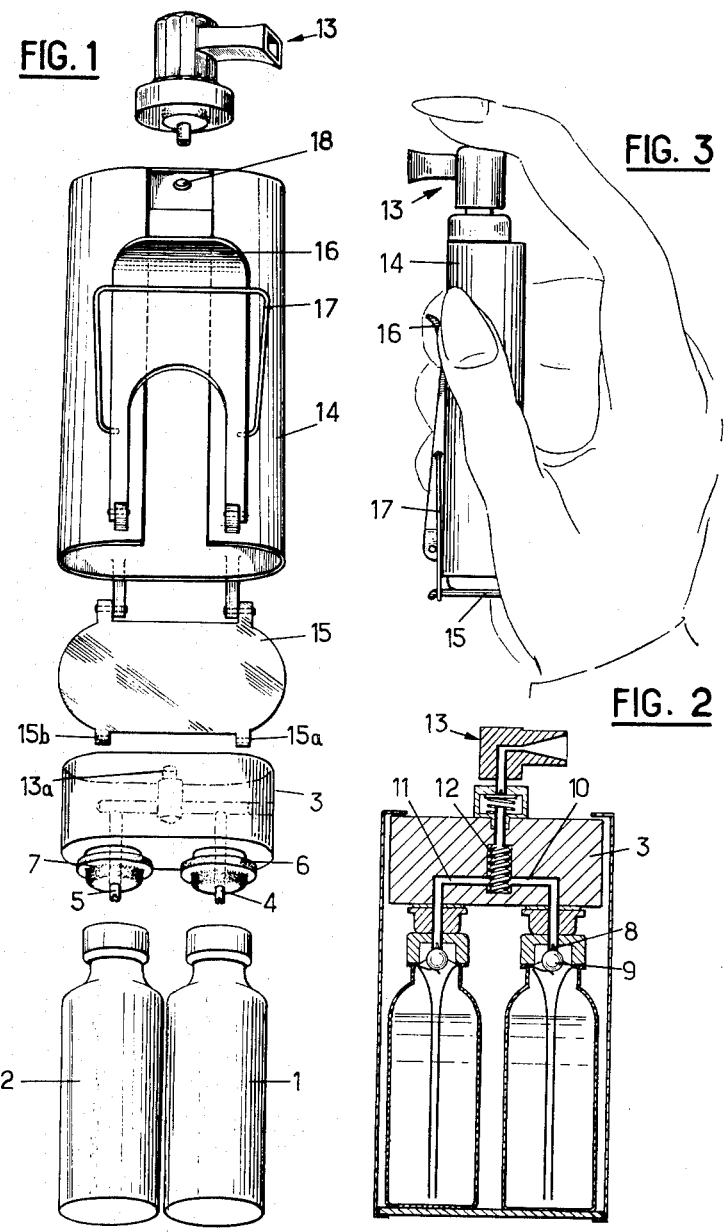

By Holcombe, Wetherill, + Brisebois
Attorneys

United States Patent Office

3,236,418
Patented Feb. 22, 1966

3,236,418
APPARATUS FOR PRODUCING CONSTANT PROPORTION MIXTURES OF TWO OR MORE AEROSOLS
Francois Dalle, Neuilly-sur-Seine, and Gregoire Kalopissis and Boris Daragan, Paris, France, assignors to Société Anonyme dite: L'Oreal, a corporation of France
Filed Nov. 12, 1963, Ser. No. 322,969
Claims priority, application France, Nov. 16, 1962, 915,704, Patent 1,353,494
7 Claims. (Cl. 222—135)

It is already known for numerous products to be used in the aerosol packaging, and for this purpose such products are generally arranged in the form of a solution in a can which also contains a propellant constituted by a gas or a mixture of liquefied gases under pressure so that, when the can is opened, the product is projected either in the form of more or less finely divided droplets, or in the form of a foam.

The present invention has as its object to provide apparatus whereby several products can be discharged simultaneously in the form of an aerosol in such a manner that they are mixed automatically and in constant, pre-determined proportions.

According to this invention, there is provided means for forming a constant proportion mixture of two or more aerosols such means comprising apparatus for opening simultaneously individual cans containing solutions of the aerosols to be mixed, ducting each of the aerosol solutions from said cans separately to a mixing chamber via a calibrated orifice which determines the rate of flow of such aerosol solution and finally discharging aerosol solution mixture into the atmosphere from said mixing chamber through a variable opening valve.

The means according to the invention may be used in many fields and is particularly suitable, for example, for dispensing hair-colouring products having a base of oxidation colouring substances which require, just before use, the addition of an oxidising solution for permitting the polymerisation of the colouring substances to be effected.

According to a further aspect of this invention, there is provided apparatus for producing a constant proportion mixture of two or more aerosols, such apparatus comprising a container for receiving valved cans containing solutions of the aerosols to be mixed, a plurality of hollow stems one connectible to each of the aerosol cans, a mixing chamber to which each of the said hollow stems is individually connected by a duct including an orifice of calibrated cross-section, and means for opening the valves of all of the cans simultaneously, and preferably fully, so as to bring their contents into communication with the mixing chamber, the mixing chamber having an outlet to the atmosphere controlled by a variable opening valve.

In order that this invention may more readily be understood, reference will now be made by way of example to the accompanying drawings, in which:

FIGURE 1 is an exploded perspective view of apparatus according to this invention for carrying out the method of the invention in a case where it is desired to mix the contents of two aerosol cans;

FIGURE 2 is a diagrammatic sectional view of the apparatus of FIGURE 1 in an assembled condition;

FIGURE 3 is a perspective view showing how the apparatus of FIGURES 1 and 2 is used.

Figure 4:
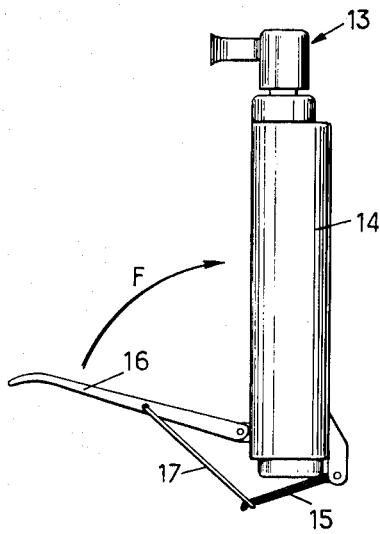
FIGURE 4 is a side view of the apparatus illustrating how it is charged.

Referring to the drawings, the references 1 and 2 represent two aerosol cans, the contents of which are to be mixed in constant, pre-determined proportions. These cans are preferably filled so that their internal pressures are, and remain, equal.

The apparatus illustrated comprises a distributor block 3 which has at its lower portion two hollow stems 4 and 5 debouching from the centres of rubber studs 6 and 7.

The hollow stems 4 and 5 are provided at their lower portion with a diametral slot 8 such that, when the hollow stems are applied against the closure members 9 of the aerosol cans as shown in FIGURE 2, the valves of the aerosol cans are opened and the interiors of the cans are put into communication with ducts 10 and 11 to which the hollow stems 4 and 5 are connected, sealing tightness about the hollow stems being ensured by the rubber studs 6 and 7.

The closure member for each of the cans has been shown diagrammatically in FIGURE 2 as a ball 9. It will, however, be apparent that such closure member may be a valve of any other convenient type.

The diametral slots 8 constitute calibrated orifices determining the rates of flow of aerosol into the ducts 10 and 11. Such calibrated orifices could equally well, if desired, be constituted by diaphragms in the ducts 10 and 11 or any other suitable means.

However, it is essential for the satisfactory operation of the apparatus that the rate of flow of each aerosol can should be determined by its calibrated orifice, whatever form this takes, and that the arrangement should be such that the valve of each aerosol can is opened fully or almost fully so that such valve does not cause any limitation of the rate of flow which might otherwise disturb the satisfactory carrying out of the method of this invention.

Within the block 3 is a mixing chamber 12 to which the ducts 10 and 11 lead and which contains a helical member for promoting the mixing of the two aerosol solutions. Such member could be replaced by any other convenient mixing aid.

At its upper end, the chamber 12 is connected to a distribution valve 13 secured to the block 3 and from which the mixture of the two aerosol solutions may be discharged at a regulatable rate of flow. The valve is spring biased to a closed position and is operable by depression against this spring of hollow stem at the upper part of the valve.

The distributor block 3 and the aerosol cans 1 and 2 are accommodated in a container 14 which is provided at its lower portion with a pivotable cover 15 co-operating with a lever 16 provided with a stirrup 17 which can engage on hooks 15a and 15b on the cover 15.

The dimensions of the container 14 are such that, when the block 3 and the cans 1 and 2 are introduced into the container 14 without exerting any supplementary pressure for forcing the cans within the container, the position is as shown in FIGURE 4 and the cover 15, lever 16 and stirrup 17 can be brought to the position shown. It is then possible to pass the lower end of valve 13 through the orifice 18 at the top of the container 14 and on to the top of a duct 13a in the distributor block 3 and leading from the mixing chamber 12. The apparatus is then ready for operation.

For obtaining the mixture in conformance with the invention, the lever 16 is then swung upwardly in the direction indicated by the arrow F (FIGURE 4) in order to bring such lever into the position shown in FIGURE 3.

As a result, first the upper ends of the cans 1 and 2 are pressed against the studs 6 and 7 and consequently ensure sealing-tightness between the said cans and the ducts 10 and 11, and then the hollow stems 4 and 5 engage within the cans and simultaneously depress the closure members 9 so that the aerosol cans 1 and 2 are put in communication with the mixing chamber 12 through the agency of the slots 8 which, as explained hereinbefore, serve as calibrated orifices.

Although the mixing chamber is under pressure, the valve 13 closes the mixing chamber and nothing is discharged from the apparatus.

If the nozzle of valve 13 is then depressed, the contents of the cans 1 and 2 are put in communication with the exterior and the apparatus discharges a mixture of aerosols which has constant pre-determined proportions. In order to stop the discharge, it is merely necessary to relax the pressure on the nozzle of valve 13.

If the contents of the cans 1 and 2 are so arranged as to ensure that the pressures in the cans remain constant, particularly uniform mixtures are obtained the proportions of whose constituents are constant. In practice, and in cases where it is intended only to mix two aerosol compositions, it is preferable that the calibrated orifices of the ducts 10 and 11 should be absolutely identical and that the predetermined proportioning of the various constituents should be effected by pre-regulating the pressure which is made to prevail in each of the aerosol cans.

This arrangement has the advantage that the aerosol cans can be positioned equally well on either of the two nozzles.

What we claim is:

1. Apparatus for producing in constant proportions a mixture of two or more aerosols, said apparatus comprising a container for receiving valved cans containing solutions of the aerosols to be mixed, a mixing chamber carried by said container, a plurality of duct means communicating with said chamber, each duct means terminating in a hollow stem projecting inwardly with respect to said container and adapted to be connected to one of said aerosol cans, each duct means being provided with an orifice of calibrated cross-section and said mixing chamber being provided with an outlet to the ambient atmosphere, means for causing said hollow stems to open the valves of all of said cans simultaneously so as to bring their contents into communication with the mixing chamber through said duct means, and a variable opening valve controlling said mixing chamber outlet.

2. Apparatus according to claim 1, wherein the said container has at the upper part thereof a block in which said mixing chamber is formed and from the lower surface of which said hollow stems project.

3. Apparatus according to claim 1 wherein said hollow stems project from resilient studs adapted, in use of the apparatus, to be pressed tightly against the tops of the aerosol cans.

4. Apparatus according to claim 1 wherein the container has an openable bottom through which the aerosol cans may be inserted in the container, and a cover for such bottom and said means for causing said hollow stems to open the valves on said aerosol cans comprises means for applying closure pressure to such cover.

5. Apparatus according to claim 1 wherein the said variable opening valve is removably mounted on the top of the container.

6. Apparatus according to claim 14 wherein a plurality of aerosol cans are fitted in said container with the hollow stems of the apparatus engaged in, and opening, the valves of the aerosol cans.

7. Apparatus according to claim 6, wherein the said calibrated orifices are of equal dimensions and the pressures in the aerosol cans are proportional to the proportions in which the aerosols are desired to be mixed.

References Cited by the Examiner

UNITED STATES PATENTS

| | | | |
|---|---|---|---|
| 2,637,466 | 5/1953 | Wright | 222—183 X |
| 2,766,072 | 10/1956 | Commarato | 222—173 X |
| 2,819,723 | 1/1958 | Meyer | 222—145 X |
| 2,876,935 | 3/1959 | Lindberg | 222—145 |
| 2,941,696 | 6/1960 | Homm | 222—145 X |
| 3,096,001 | 7/1963 | Boe et al. | 222—135 |
| 3,105,615 | 10/1963 | Koga | 222—145 X |
| 3,133,680 | 5/1964 | Sliwinski | 222—182 X |

RAPHAEL M. LUPO, *Primary Examiner.*

LOUIS J. DEMBO, *Examiner.*

FRED R. HANDREN, *Assistant Examiner.*